United States Patent
Stokes et al.

(10) Patent No.: US 7,831,035 B2
(45) Date of Patent: Nov. 9, 2010

(54) INTEGRATION OF A MICROPHONE ARRAY WITH ACOUSTIC ECHO CANCELLATION AND CENTER CLIPPING

(75) Inventors: Jack W. Stokes, North Bend, WA (US); Chao He, Redmond, WA (US); Qin Li, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1158 days.

(21) Appl. No.: 11/413,710

(22) Filed: Apr. 28, 2006

(65) Prior Publication Data

US 2007/0263849 A1    Nov. 15, 2007

(51) Int. Cl.
*H04M 9/08*    (2006.01)
(52) U.S. Cl. .............................. 379/406.01; 370/286
(58) Field of Classification Search ................. 379/406; 381/313, 92
See application file for complete search history.

(56) References Cited

U.S. PATENT DOCUMENTS

| | | | |
|---|---|---|---|
| 4,039,753 A | 8/1977 | Balogh et al. | |
| 4,069,395 A | 1/1978 | Nash | |
| 4,275,398 A | 6/1981 | Parker et al. | |
| 4,359,606 A | 11/1982 | Shoichi | |
| 4,636,586 A | 1/1987 | Schiff | |
| 4,696,015 A | 9/1987 | Palicot et al. | |
| 4,696,032 A | 9/1987 | Levy | |
| 5,099,472 A | 3/1992 | Townsend et al. | |
| 5,263,019 A | 11/1993 | Chu | |
| 5,305,307 A | 4/1994 | Chu | |
| 5,323,459 A | 6/1994 | Hirano | |
| 5,353,348 A | 10/1994 | Sendyk et al. | |
| 5,430,796 A | 7/1995 | Komoda et al. | |
| 5,454,041 A | 9/1995 | Davis | |
| 5,477,534 A | 12/1995 | Kusano | |
| 5,542,000 A | 7/1996 | Semba | |
| 5,559,793 A | 9/1996 | Maitra et al. | |
| 5,619,582 A | 4/1997 | Oltman et al. | |
| 5,646,990 A | 7/1997 | Li | |
| 5,666,407 A | 9/1997 | Pfeifer | |
| 5,680,450 A | 10/1997 | Dent et al. | |
| 5,721,730 A * | 2/1998 | Genter | 370/288 |

(Continued)

FOREIGN PATENT DOCUMENTS

GB    2269968    3/1996

(Continued)

OTHER PUBLICATIONS

U.S. Appl. No. 11/414,776.*

(Continued)

*Primary Examiner*—Walter F Briney, III
(74) *Attorney, Agent, or Firm*—Klarquist Sparkman, LLP

(57) ABSTRACT

Center clipping is applied with acoustic echo suppression in a two-way voice communication system to reduce a microphone signal to the background noise floor when speech is not present. For integration with a microphone array, the center clipping processing determines whether speech is present based on estimates of the overall leak through and instantaneous microphone power across the microphone array channels. The overall estimates can be calculated as a dot product of the microphone array coefficients computed by a sound source localization process and separate estimates for the respective microphone channel.

6 Claims, 13 Drawing Sheets

U.S. PATENT DOCUMENTS

| | | | |
|---|---|---|---|
| 5,923,749 A | 7/1999 | Gustafsson et al. | |
| 6,002,776 A | 12/1999 | Bhadkamkar et al. | |
| 6,044,150 A | 3/2000 | Rigstad et al. | |
| 6,205,124 B1 | 3/2001 | Hamdi | |
| 6,215,880 B1 | 4/2001 | Hasegawa | |
| 6,219,418 B1 | 4/2001 | Eriksson et al. | |
| 6,324,170 B1 | 11/2001 | McClennon et al. | |
| 6,377,679 B1 | 4/2002 | Hashimoto et al. | |
| 6,418,203 B1 | 7/2002 | Marcie | |
| 6,535,609 B1 | 3/2003 | Finn et al. | |
| 6,574,336 B1* | 6/2003 | Kirla | 379/406.01 |
| 6,707,910 B1 | 3/2004 | Valve et al. | |
| 6,724,736 B1 | 4/2004 | Azriel | |
| 6,738,358 B2 | 5/2004 | Bist et al. | |
| 6,748,086 B1 | 6/2004 | Venkatesh et al. | |
| 6,868,157 B1 | 3/2005 | Okuda | |
| 7,031,269 B2 | 4/2006 | Lee | |
| 7,085,370 B1 | 8/2006 | Arana-Manzano et al. | |
| 7,433,463 B2* | 10/2008 | Alves et al. | 379/406.14 |
| 2002/0101982 A1 | 8/2002 | Elabd | |
| 2003/0174847 A1 | 9/2003 | Lane et al. | |
| 2003/0206624 A1 | 11/2003 | Domer et al. | |
| 2004/0001597 A1 | 1/2004 | Marton | |
| 2004/0001598 A1 | 1/2004 | Balan et al. | |
| 2004/0013275 A1 | 1/2004 | Balan et al. | |
| 2004/0125942 A1* | 7/2004 | Beaucoup et al. | 379/406.01 |
| 2004/0141528 A1 | 7/2004 | LeBlanc et al. | |
| 2006/0018459 A1 | 1/2006 | McCree | |
| 2007/0165837 A1 | 7/2007 | Zhong et al. | |
| 2007/0165838 A1 | 7/2007 | Li et al. | |
| 2007/0263849 A1 | 11/2007 | Stokes et al. | |
| 2007/0263850 A1 | 11/2007 | Stokes et al. | |
| 2007/0280472 A1 | 12/2007 | Stokes et al. | |
| 2009/0207763 A1 | 8/2009 | Li et al. | |

FOREIGN PATENT DOCUMENTS

WO    WO 2007147033 A2    12/2007

OTHER PUBLICATIONS

Buchner et al., "Wave-Domain Adaptive Filtering: Acoustic Echo Cancellation for Full-Duplex Systems Based on Wave-Field Synthesis," Proceedings of the 2004 IEEE International Conference on Acoustics, Speech, and Signal Processing, vol. 4, 2004, pp. IV-117-IV-120.

CISCO, "Configuring Echo Cancellation," http://www.cisco.com/en/US/docs/ios/12_3/vvf_c/voice_port_configuration_guide/ch5_echo.html, © 1992-2008, 17 pages.

"Echo Cancellation," Chapter 4, pp. 1-8 (1990).

Hoshuyama, "Nonlinear Echo Suppression Technology Enabling Quality Handsfree Talk for Compact Equipment," NEC Technical Journal, vol. 2, No. 2, 2007, pp. 27-30.

Yensen et al., "Echo Target Determination Using Acoustic Round Trip Delay for Voice Over IP Conferences," Proceedings of the 1999 IEEE International Symposium on Circuits and Systems, vol. 4, 1999, pp. IV-348-IV-351.

Knowles Acoustics, "Beat the Noise and Echo, Communicate Anywhere via VoIP," <http://www.speechtechmag.com/whitepapers/knowlesa.pdf>, 11 pages, 2004.

Ditech Communications, "Ditech's Voice Quality Assurance™," <http://www.ditechcom.com/platforms/DataSheets/OV_VQA.pdf>, 2 pages, 2005.

Herbordt et al., "Joint Optimization of Lcmv Beamforming and Acoustic Echo Cancellation," <http://www.slt.atr.jp/~wherbord/archives/mypub/HerbordtJoint_optimization_of_LCMV_beamforming_and_acoustic_echo_cancellation.pdf>, 4 pages, 2006.

Ahgren, "Teleconferencing, System Identification and Array Processing," *IT Licentiate Thesis*, Uppsala University Department of Information Technology, <http://www.it.uu.se/research/publications/lic/2001-012/2001-012.pdf>, 75 pages, Oct. 2001.

* cited by examiner

Software 1780 Implementing Processing of Microphone Array-Integrated Residual Echo Suppression and Center Clipping

INTEGRATION OF A MICROPHONE ARRAY WITH ACOUSTIC ECHO CANCELLATION AND CENTER CLIPPING

BACKGROUND

Acoustic Echo Cancellation (AEC) is a digital signal processing technology which is used to remove the acoustic echo from a speaker phone in two-way (full duplex) or multi-way communication systems, such as traditional telephone or modern internet audio conversation applications.

1. Overview of AEC Processing

FIG. 1 illustrates an example of one end 100 of a typical two-way communication system, which includes a capture stream path and a render stream path for the audio data in the two directions. The other end is exactly the same. In the capture stream path in the figure, an analog to digital (A/D) converter 120 converts the analog sound captured by microphone 110 to digital audio samples continuously at a sampling rate ($fs_{mic}$). The digital audio samples are saved in capture buffer 130 sample by sample. The samples are retrieved from the capture buffer in frame increments (herein denoted as "mic[n]"). Frame here means a number (n) of digital audio samples. Finally, samples in mic[n] are processed and sent to the other end.

In the render stream path, the system receives audio samples from the other end, and places them into a render buffer 140 in periodic frame increments (labeled "spk[n]" in the figure). Then the digital to analog (D/A) converter 150 reads audio samples from the render buffer sample by sample and converts them to an analog signal continuously at a sampling rate, $fs_{spk}$. Finally, the analog signal is played by speaker 160.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice but also an echo of the sound played from the speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

echo(t)=spk(t)*g(t)=∫$_0^{T_e}$g(τ)·spk(t−τ)dτ where * means convolution, $T_e$ is the echo length or filter length of the room response.

In order to remove the echo for the remote user, AEC 210 is added in the system as shown in FIG. 2. When a frame of samples in the mic[n] signal is retrieved from the capture buffer 130, they are sent to the AEC 210. At the same time, when a frame of samples in the spk[n] signal is sent to the render buffer 140, they are also sent to the AEC 210. The AEC 210 uses the spk[n] signal from the far end to predict the echo in the captured mic[n] signal. Then, the AEC 210 subtracts the predicted echo from the mic[n] signal. This difference or residual is the clear voice signal (voice[n]), which is theoretically echo free and very close to the near end user's voice (voice(t)).

FIG. 3 depicts an implementation of the AEC 210 based on an adaptive filter 310. The AEC 210 takes two inputs, the mic[n] and spk[n] signals. It uses the spk[n] signal to predict the mic[n] signal. The prediction residual (difference of the actual mic[n] signal from the prediction based on spk[n]) is the voice[n] signal, which will be output as echo free voice and sent to the far end.

The actual room response (that is represented as g(t) in the above convolution equation) usually varies with time, such as due to change in position of the microphone 110 or speaker 160, body movement of the near end user, and even room temperature. The room response therefore cannot be predetermined, and must be calculated adaptively at running time. The AEC 210 commonly is based on adaptive filters such as Least Mean Square (LMS) adaptive filters 310, which can adaptively model the varying room response.

In addition to AEC, these voice communications systems (e.g., alternative system 400 shown in FIG. 4) may also provide center clipping (CC) 410 processing of the audio signal captured by the microphone. Center clipping further reduces echo (after acoustic echo cancellation 210) by setting the magnitude of the processed microphone signal equal to the magnitude of the background noise floor during periods when echo is detected, but no near-end speech is present.

The full-duplex communication experience can be further improved by two additional processes for processing the near-end speech signal. These include a residual echo suppression (RES) process that further suppresses the acoustic echo from the speakers; and a microphone array process that improves the signal to noise ratio of the speech captured from multiple microphones. One subcomponent of the microphone array process is a sound source localization (SSL) process used to estimate the direction of arrival (DOA) of the near-end, speech signal.

2. Overview of RES Processing

FIG. 5 illustrates a conventional residual echo suppression (RES) process 500. The representative RES process is applied to a microphone channel c following the AEC process.

Upon starting, the RES process is initialized (510) to the following initial state of weight ($w_c$), complex, frequency domain AEC residual ($X_c(f,t)$), and far-end signal power ($P_c(f,t)$):

$w_c(0)=0$ $X_c(f,t)=0$ for $t \leq 0$ $P_c(f,0)=\|X_c(f,1)\|^2$ where f is the individual frequency band and t is the frame index. Here, the weight is a factor applied in the RES process to predict the residual signal magnitude. The complex AEC residual is the output produced by the previous AEC process in the microphone channel. The far-end signal power is the power of the far-end signal calculated in the RES process.

As indicated at 520, 590 in FIG. 5, the RES process 500 repeats a processing loop (actions 530-580) for each frame t=1, . . . , ∞ of the microphone channel. In the processing loop, the RES process 500 first predicts (action 530) the residual signal magnitude estimate by the equation, $$\hat{R}_c(f, t) = \sum_{i=0}^{L-1} w_{c,i}(t)|X_c(f, t-i)|$$

At action 540, the RES process 500 computes the error signal as a function of the magnitude of the AEC residual $M_c$, the residual signal magnitude estimate, and the noise floor $NF_c(f,t)$, via the equation:

$$E_c(f,t)=\max(|M_c(f,t)|-\hat{R}_c(f,t),NF_c(f,t))) \quad (1)$$

At action 550, the RES process 500 computes the smoothed far-end signal power using the calculation, $$P_c(f,t)=\alpha P_c(f,t-1)+(1-\alpha)\|X_c(f,t)\|^2$$

At action 560, the RES process 500 computes the normalized gradient $$\nabla_c(t) = \frac{-2E_c(f, t)|X_c(f, t)|}{P_c(f, t)}$$

At action 570, the RES process 500 updates the weight with the following equation, $$w_c(t+1) = w_c(t) - \frac{\mu}{2}\nabla_c(t)$$

At action 580, the RES process 500 applies the gain to the AEC Residual phase to produce the RES process output ($B_c(f,t)$) using the following calculation, where $\phi_c(f,t)$ is the phase of the complex AEC residual, $X_c(f,t)$, $$B_c(f,t)=E_c(f,t)e^{j\phi_c(f,t)} \quad (2)$$

The RES process 500 then continues to repeat this processing loop (actions 530-580) for a subsequent frame as indicated at 590. With this processing, the RES process is intended to predict and remove residual echo remaining from the preceding acoustic echo cancellation applied on the microphone channel. However, the RES process 500 includes a non-linear operation, i.e., the "max" operator in equation (1). The presence of this non-linear operation in the RES process 500 may introduce non-linear phase effects in the microphone channel that can adversely affect the performance of subsequent processes that depend upon phase and delay of the microphone channel, including the SSL/MA process.

3. Overview of Center Clipping

FIG. 6 shows an overview of a center clipping (CC) process 600 that is known in the art. The illustrated CC process performs center clipping for a single frequency band. The CC process 600 is run separately on each of the frequency bands on which center clipping is to be performed.

The CC process 600 operates as follows. A multiplier block 610 multiplies an estimate of the peak speaker signal ("SpkPeak") by an estimate of the speaker to microphone gain ("SpkToMicGain"), producing a leak through estimate ("leak through") of the peak speaker echo in the microphone signal. Next, the leak through estimate is filtered across the neighboring frequency bands in block 620 to produce a filtered leak through estimate. Reverberance block 630 scales the filtered, leak through estimate by another parameter to account for the amount of reverberance in the particular band, yielding the value labeled as A.

In parallel, filter blocks 640, 650 separately filter the instantaneous microphone power and residual power across the neighboring frequency bands. Block 660 selects the minimum of the two filtered power results to produce the value labeled as B. As indicated at block 670, if A>B, then a flag is set to 1. Otherwise, the flag is set to 0. If the flag is set to 0, then the AEC residual for band f is not changed, and block 680 outputs the AEC residual as the CC process output. However, if the flag is set to 1, then block 680 instead sets the AEC residual in band f to a complex value with the magnitude equal to the background noise floor, and the phase is set to a random value between 0 and 360 degrees produced at block 690.

This conventional center clipping process is designed to operate on a single microphone channel. This conventional process does not allow for the multiple microphone channels in a microphone array, due to the non-linear process in block 680. In addition, a microphone array has separate speaker to microphone gain for each microphone channel, and separate instantaneous microphone power.

SUMMARY

The following Detailed Description presents various ways to integrate residual echo suppression and center clipping with sound source localization, and microphone array processing in two-way communication systems. In particular, various configurations or architectures for combining residual echo suppression into a system with audio echo cancellation and sound source localization with microphone arrays in ways that address the non-linear processing issue are presented. Additionally, modifications or extensions of the center clipping processing to permit integration with microphone array processing are presented.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to implementations of residual echo suppression and center clipping that permit integration with sound source localization/microphone array processing, and their application in two-way audio/voice communication systems (e.g., traditional or internet-based telephony, voice chat, and other two-way audio/voice communications). Although the following description illustrates the inventive integration of residual echo suppression and center clipping with sound source localization/microphone array processing in the context of an internet-based voice telephony, it should be understood that this approach also can be applied to other two-way audio communication systems and like applications.

1. RES and SSL/MA Integration

Figure 7:
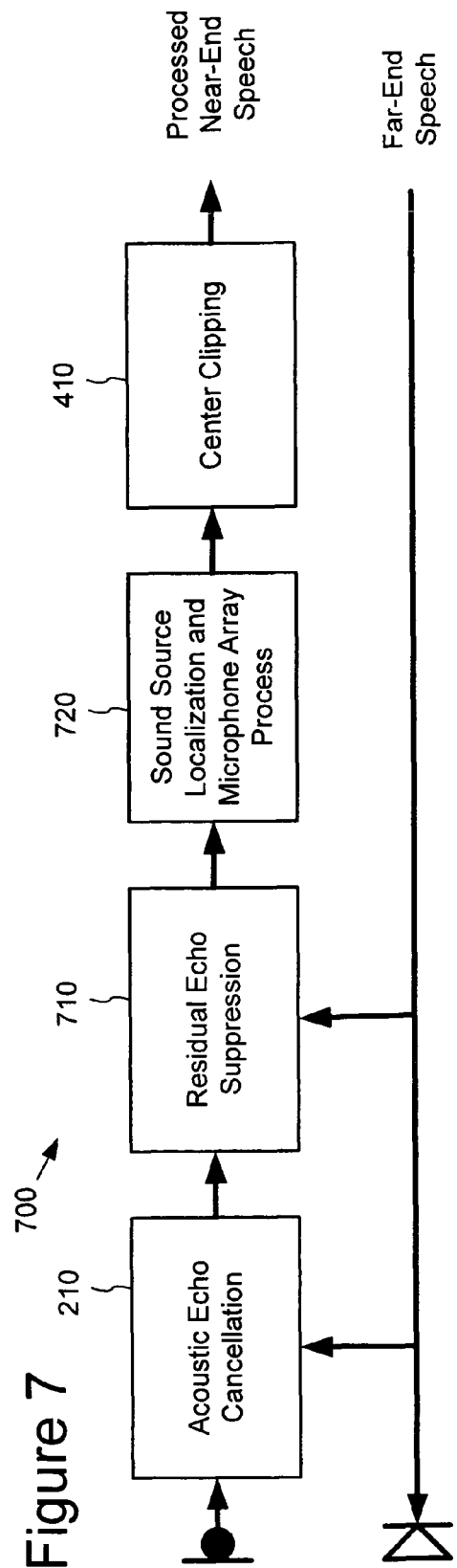
FIG. 7 is a block diagram of a single microphone channel of a multiple microphone audio capture system of one end of a two-way communication system with acoustic echo cancellation, residual echo suppression, combined sound-source localization/microphone array processing and center clipping.
Figure 8:
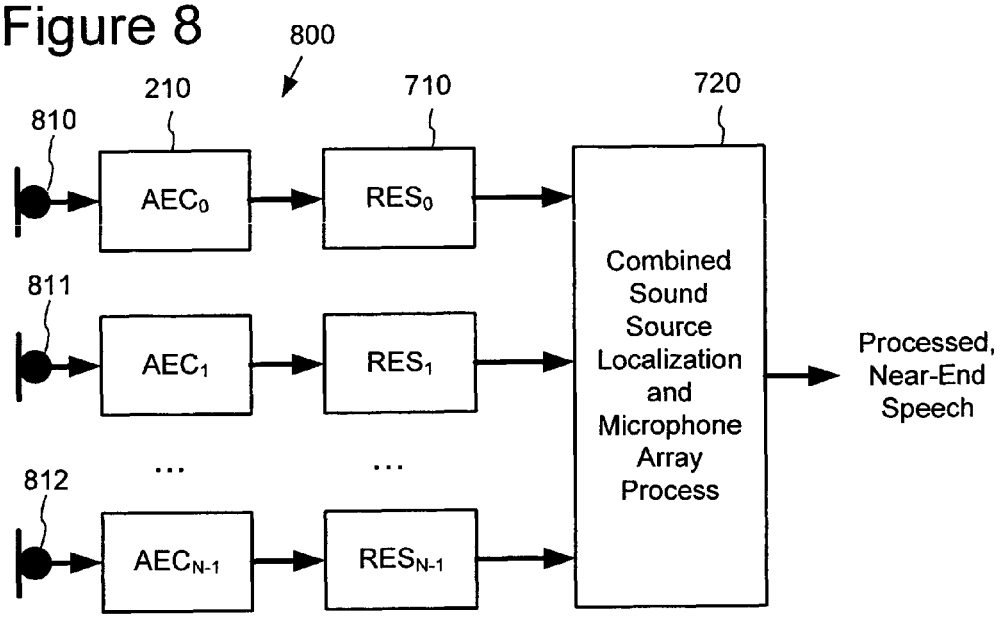
FIG. 8 is a block diagram of one end of a two-way voice communication system having multiple microphone channels, in which the single channel arrangement of FIG. 7 is replicated for each of the multiple channels.

As shown in FIG. 7 for a single microphone channel of the multiple microphone system shown in FIG. 8, one possible processing order is AEC 210, RES 710, the combined sound source localization and microphone array (SSL/MA) process 720, and center clipping 410. In the first processing block, AEC can often reduce the echo in the captured microphone signal by 20 to 30 dB. In the second processing block, RES 710, also referred to as acoustic echo suppression, processes the AEC residual (i.e. output) further reducing the echo by up to 8 dB. In the third SSL/MA 720 stage, the microphone array process uses the DOA estimate to combine the individual microphone channels thereby improving the quality of the near-end speech signal relative to the noise floor in the near-end room.

Although possible to arrange the AEC, RES, SSL/MA and CC processes in the processing order shown in FIG. 7, the combined SSL/MA process requires that all processes that operate prior to the SSL/MA stage process the near-end speech signal from each individual channel using linear phase processes. Linear phase processes transform the phase of the input signal as a linear function of the frequency, while non-linear phase processes alter the phase of the input signal in some non-linear function of the frequency. The RES process includes non-linear phase components which can adversely affect the performance of the SSL/MA process.

A second problem arises due to the integration of the center clipping (CC) process with the SSL/MA process. A typical CC process compares an estimate of the peak echo signal received at the microphone to the processed AEC residual. However, as shown in FIG. 7, the CC process operates on the output of the microphone array. It is not desirable to operate the CC on each channel's AEC residual because, again, the CC process is non-linear phase which can adversely affect the output of the SSL/MA process.

FIG. 8 shows one potential architecture of a multiple microphone channel communications system 800 that combines the RES process with the SSL/MA process. This architecture simply replicates the single microphone channel architecture of FIG. 7 for each microphone channel 810-812. As in the single microphone channel architecture depicted in FIG. 7, the output of the RES process 710 constitutes the input to the combined SSL/MA process 720 in each channel. As discussed in the Background section above, this arrangement can suffer due to the non-linear phase effects of the RES process causing problems for the SSL process and perhaps the microphone array process, depending on which type of microphone array process is used. For that reason, this approach to integrating the RES process with the SSL/MA process is undesirable.

This section presents three other alternative architectures of multiple microphone channel communications systems that more successfully integrate the RES and SSL/MA processes.

Figure 9:
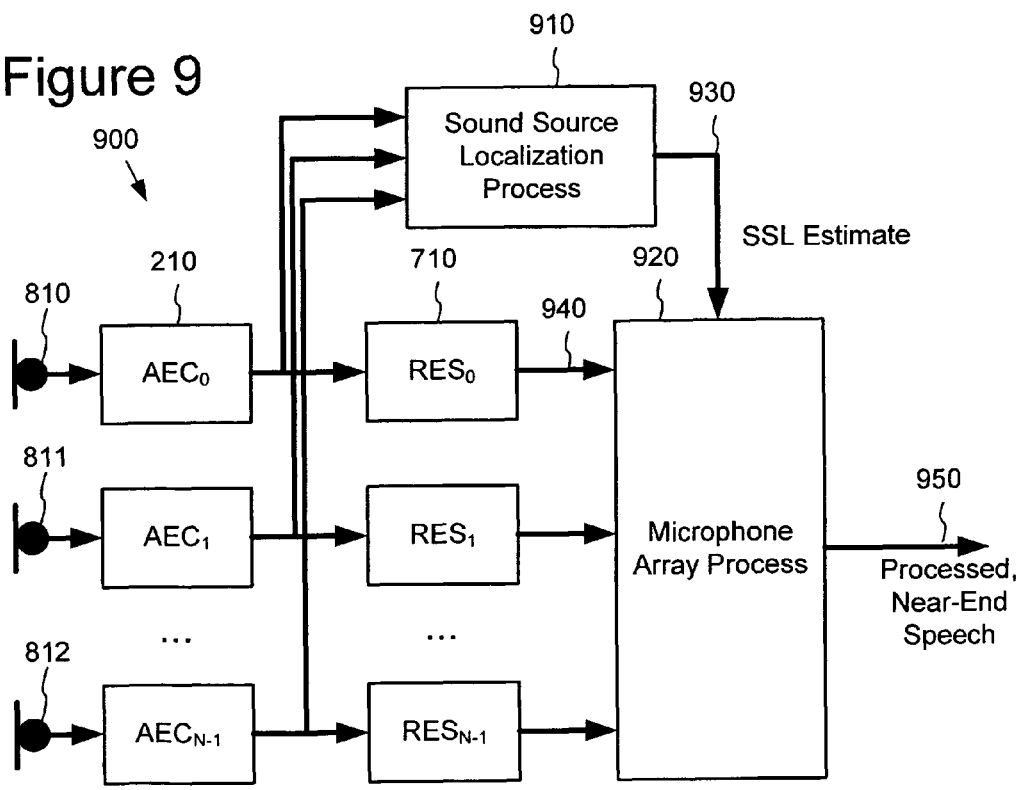
FIG. 9 is a block diagram of a first architecture for one end of a two-way voice communication system having multiple microphone channels, with integrated residual echo suppression and sound-source localization/microphone array processes.

A first alternative architecture for a multiple microphone channel voice communications system 900 with integrated RES and SSL/MA processes is shown in FIG. 9. This architecture is based on the observation that, for a beam forming type microphone array process, the non-linear phase processing may only affect the SSL process and not that of the microphone array process. Accordingly, the combined SSL/MA process is replaced with a separate SSL process 910 and a beam forming type microphone array process 920. In FIG. 9, the outputs of the AEC components are then input to the SSL process 910 as well as the RES processes 710 for each channel. The microphone array process 920 combines the SSL estimate 930 from the SSL process 910 with the outputs 940 of the RES processes 710 to produce the final, processed mono speech signal 950. The RES process 710 can be implemented using the process 500 illustrated in FIG. 5, or any of various other conventionally known residual echo suppression processes. The SSL process 910 also can be implemented using conventionally known implementations of sound source localization. The MA process in this architecture is preferably a beam-forming type microphone array process. However, other microphone array processing that is not adversely affected by the non-linearity of the RES process 710 also can be used.

Figure 10:
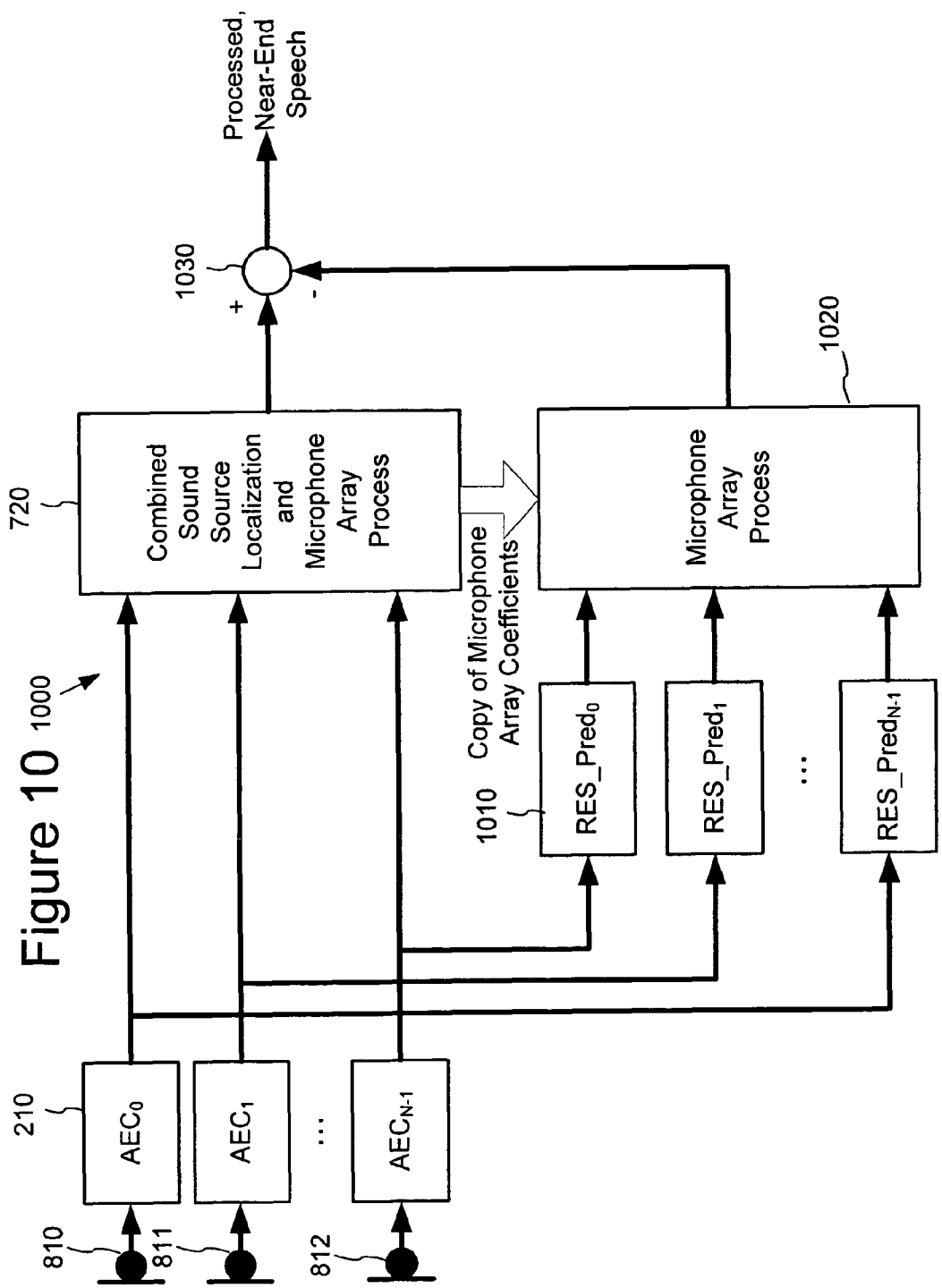
FIG. 10 is a block diagram of a second architecture for one end of a two-way voice communication system having multiple microphone channels, with integrated residual echo suppression and sound-source localization/microphone array processes.

A voice communications system 1000 based on a second alternative integrated RES and SSL/MA architecture is shown in FIG. 10. According to this alternative, the outputs of the AEC processes 210 of the microphone channels are combined using a combined SSL/MA process 720 to produce a mono voice signal output. In addition, the AEC process outputs are also fed into a parallel structure containing a separate implementation of a modified RES Prediction (RES_Pred) process 1010 for each AEC output.

Figure 1:
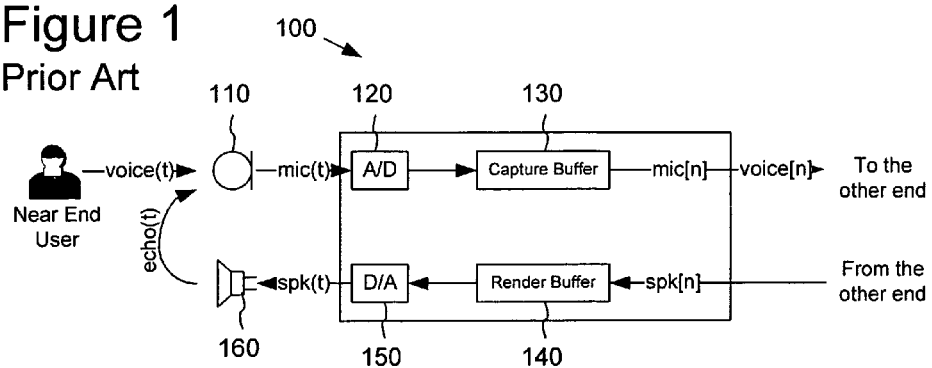
FIG. 1 is a block diagram illustrating one end of a typical two-way communication system in the prior art.
Figure 2:
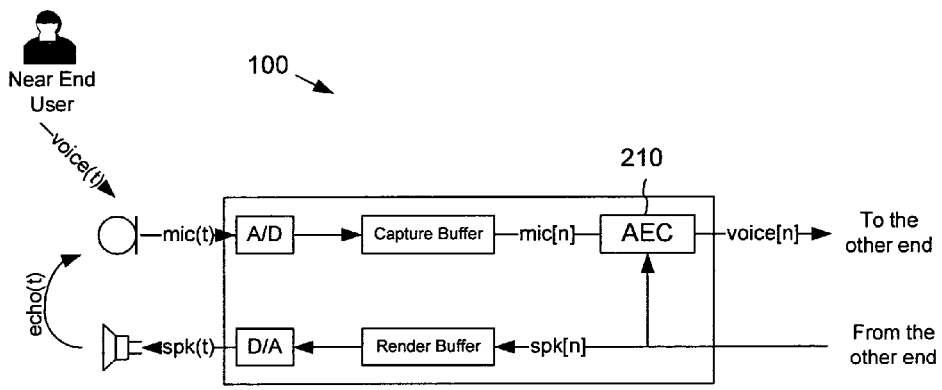
FIG. 2 is a block diagram of the two-way communication system of FIG. 1 with audio echo cancellation.
Figure 3:
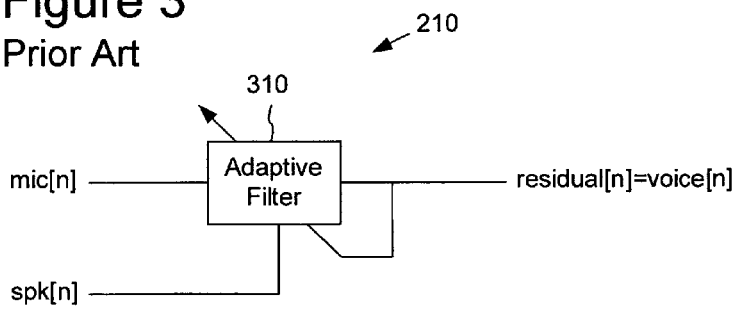
FIG. 3 is a block diagram of an implementation of audio echo cancellation based on an adaptive filter.
Figure 4:
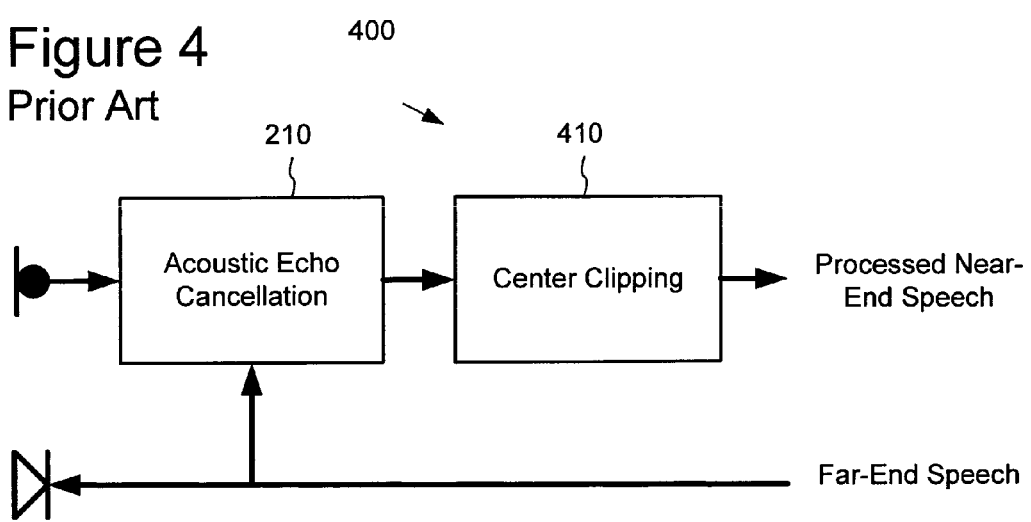
FIG. 4 is a block diagram of one end of a two-way communication system with acoustic echo cancellation and center clipping.
Figure 5:
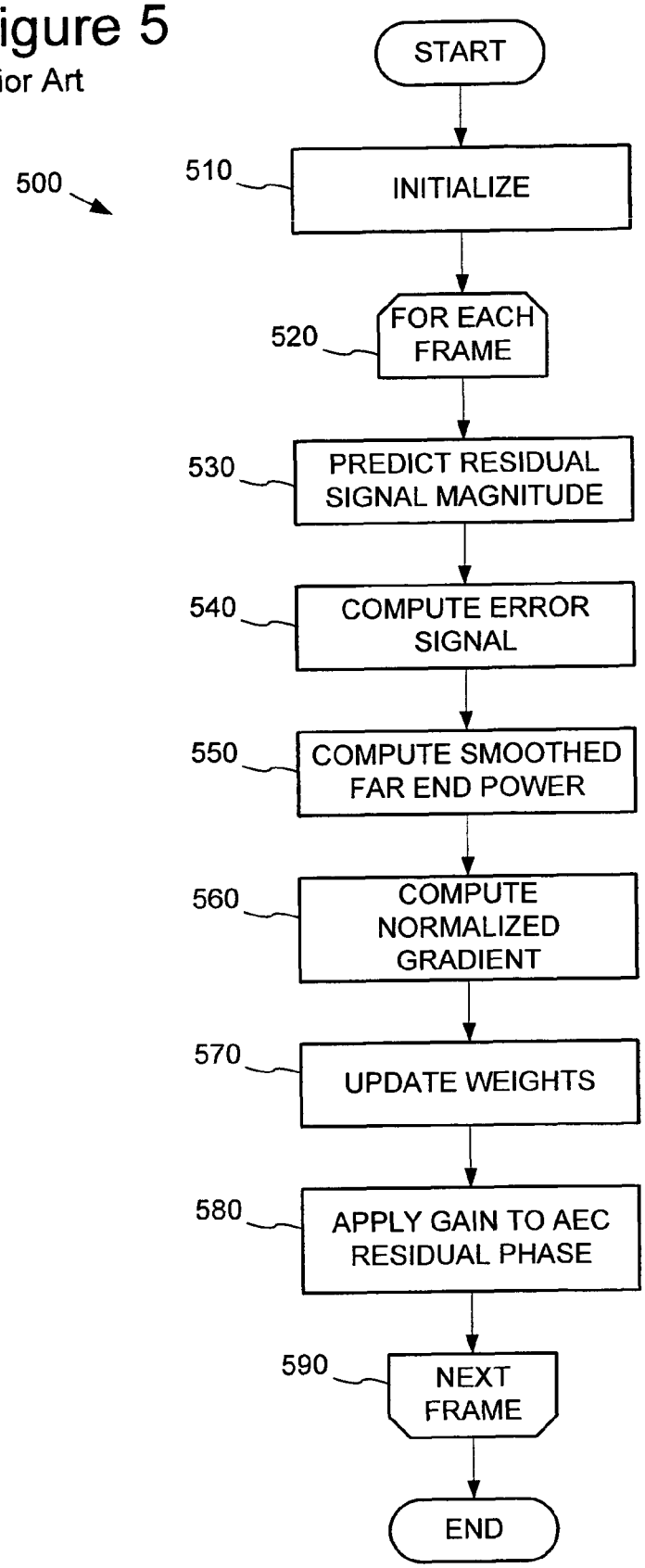
FIG. 5 is a flow chart of a conventional residual echo suppression process.
Figure 6:
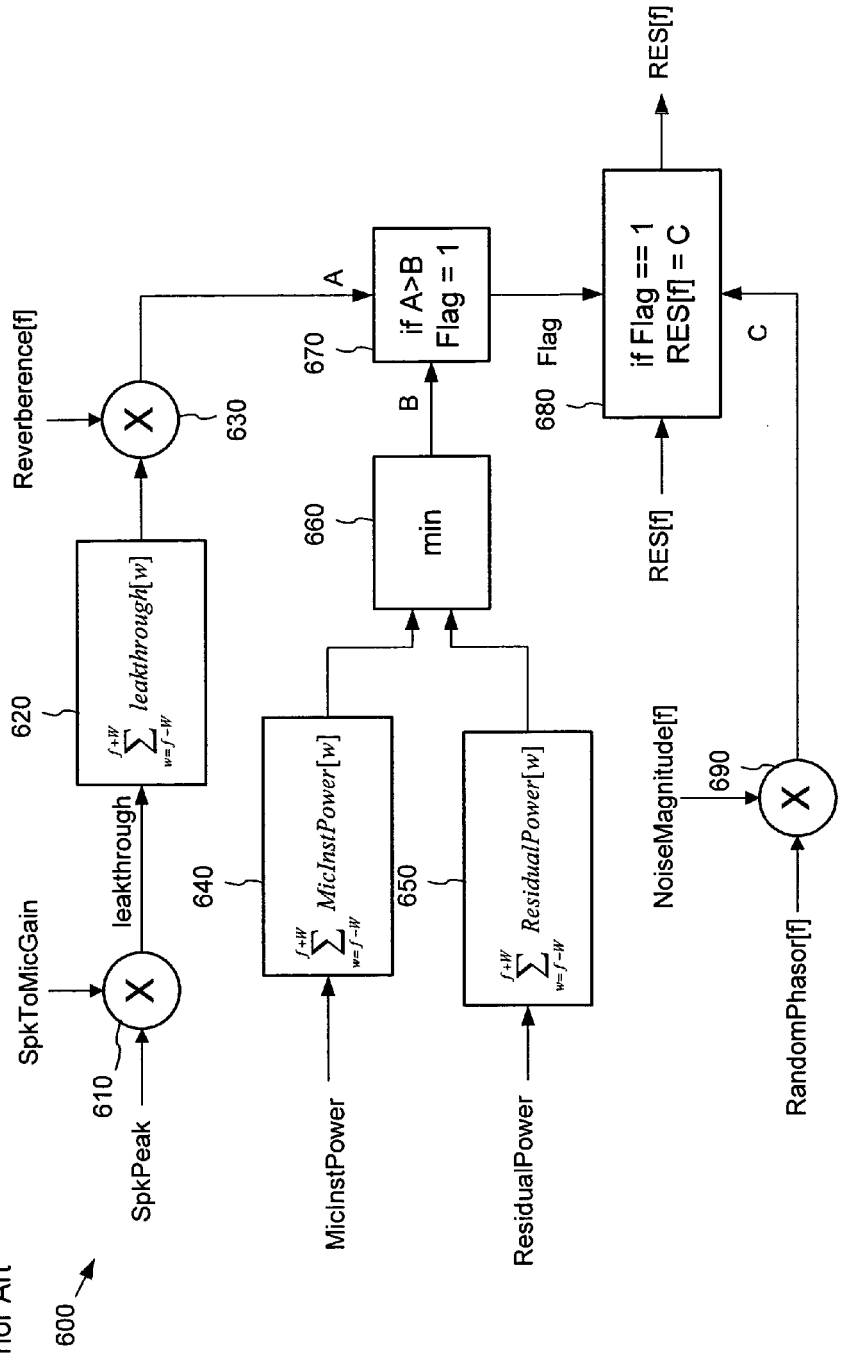
FIG. 6 is a flow diagram of a conventional center clipping process.

The RES_Pred process 1010 is similar to the standard RES process 500 shown in FIG. 5 and described in the Background section above, except for the following modification. From equation (1), the magnitude error $E_c(f,t)$ is typically equal to the difference between the magnitude of the AEC residual $|M_c(f,t)|$ and the predicted magnitude $\hat{R}_c(f,t)$ for a given channel. When the difference is greater than the noise floor, equation (2) shows that the output of the RES is equal to $$B_c(f,t) = E_c(f,t)e^{j\phi_c(f,t)} = |M_c(f,t)|e^{j\phi_c(f,t)} - \hat{R}_c(f,t)e^{j\phi_c(f,t)}$$

Simplifying leads to $$B_c(f,t) = M_c(f,t) - \hat{R}_c(f,t)e^{j\phi_c(f,t)} \quad (3)$$

where $M_c(f,t)$ is the AEC residual for channel c. As shown in FIG. 10, the inputs to the RES_Pred process 1010 are the AEC residuals. The output of the RES_Pred process 1010 is then $\hat{R}_c(f,t)e^{j\phi_c(f,t)}$ ("predicted residual echo") instead of the quantity in equation (2).

The outputs of the RES_Pred processes 1010 for the microphone channels are combined using a parallel implementation of the microphone array process 1020, and the final result is subtracted (at block 1030) from the result of the combined sound source localization/microphone array process 720 operating on the AEC residuals. The subtraction block 1030 in FIG. 10 of the combined RES_Pred outputs for all channels is equivalent to the combined subtraction of the individual RES outputs in equation (3) for a beam forming microphone array process. After the combined SSL/MA process 720 is first run on the AEC outputs producing a direction of arrival (DOA) estimate, the microphone array coefficients for the frame of data t are then copied to the parallel MA process 1020 that implements only the microphone array process (i.e., not including the SSL process) run directly on the RES outputs. For example, with the beam former type MA process, the dot product of the microphone weights with the outputs of the RES process is identical to if the beam former MA process had been run on the RES outputs directly as in FIG. 8. Since the subtraction is done after the beam former MA process, the linear phase requirements for the combined SSL/MA process are not compromised.

When the difference in equation (1) is less than the noise floor for channel c, then the RES_Pred output $\hat{R}_c(f,t)e^{j\phi_c(f,t)}$ is set to $$\hat{R}_c(f,t)e^{j\phi_c(f,t)} = M_c(f,t) - NF_c(f,t)e^{j\phi_c(f,t)}.$$

Neglecting the microphone array gain for the channel, the resulting output for channel c after the subtraction in block 1030 is $$B_c(f,t) = M_c(f,t) - (M_c(f,t) - NF_c(f,t)e^{j\phi_c(f,t)}) = NF_c(f,t)e^{j\phi_c(f,t)}.$$

which has a magnitude equal to the second condition of the maximum in equation (2).

The voice communications system 1000 can also include a maximum operator applied at the output of the subtraction block 1030 to ensure the magnitude of the difference of the combined AEC residuals by the common SSL/MA process 720 and the combined predicted residual echoes by block 1020 is greater than or equal to the magnitude of the combined noise floor produced by the common SSL/MA process 720. This maximum operator compares the magnitude of the difference of the combined AEC residuals and the combined predicted residual echoes to the magnitude of the combined noise floor. If the magnitude of the output of the difference block is greater than or equal to the magnitude of the combined noise floor, the maximum operator passes the difference signal unchanged. Otherwise, the maximum operator sets the magnitude of the difference signal to the magnitude of the combined noise floor.

Figure 11:
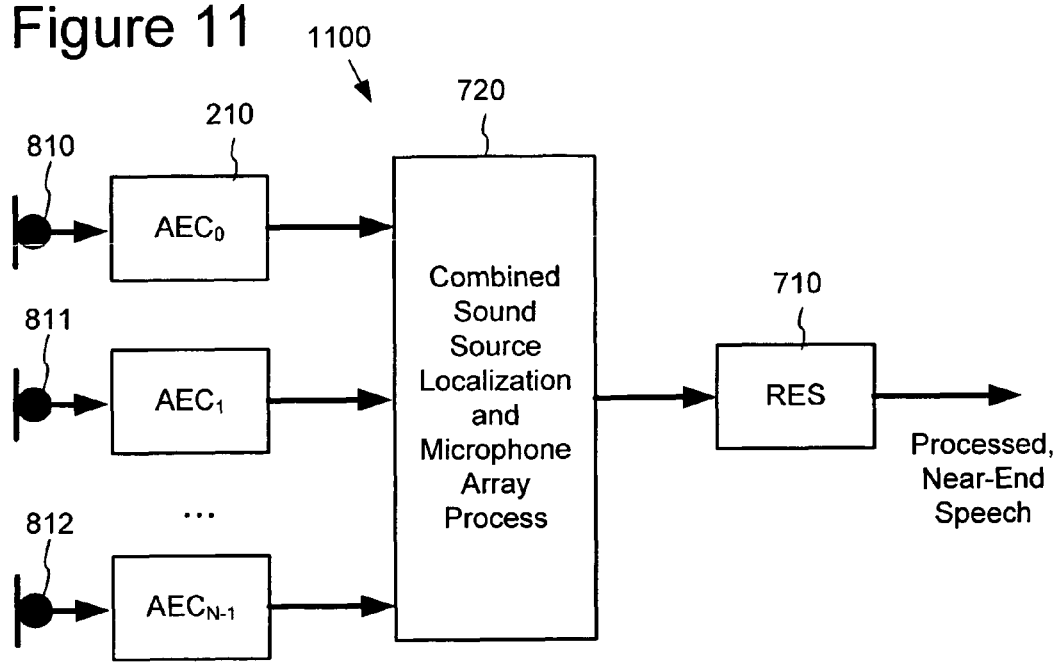
FIG. 11 is a block diagram of a third architecture for one end of a two-way voice communication system having multiple microphone channels, with integrated residual echo suppression and sound-source localization/microphone array processes.

FIG. 11 shows one end of a voice communications system 1100 according to a third alternative integrated RES and SSL/MA architecture. In this third alternative architecture, the RES process 710 is run after the combined SSL/MA process 720. Since the input to the RES process 710 is the SSL/MA output, the non-linear phase components in the RES process do not affect the SSL or microphone array processes. However, one possible drawback with this architecture is that the SSL process may steer the microphone array process quickly to a wide variety of directions (i.e., the DOA estimate of the SSL process may vary rapidly). As a result, the channel that the RES process tries to learn may not be able to effectively track the actual channel.

2. Center Clipping and SSL/MA Integration

In this section, we present an extension of a center clipping process that permits integration with the SSL/MA process.

As discussed in the Background section, the conventional center clipping process was designed to operate on a single channel. However, there are several problems related to running the conventional center clipping process after a microphone array process. For a microphone array, there is a separate speaker to microphone gain for each microphone channel. Likewise, there is a separate instantaneous microphone power for each microphone channel. As a result, there are separate leak through and instantaneous microphone power estimates for each channel.

Figure 12:
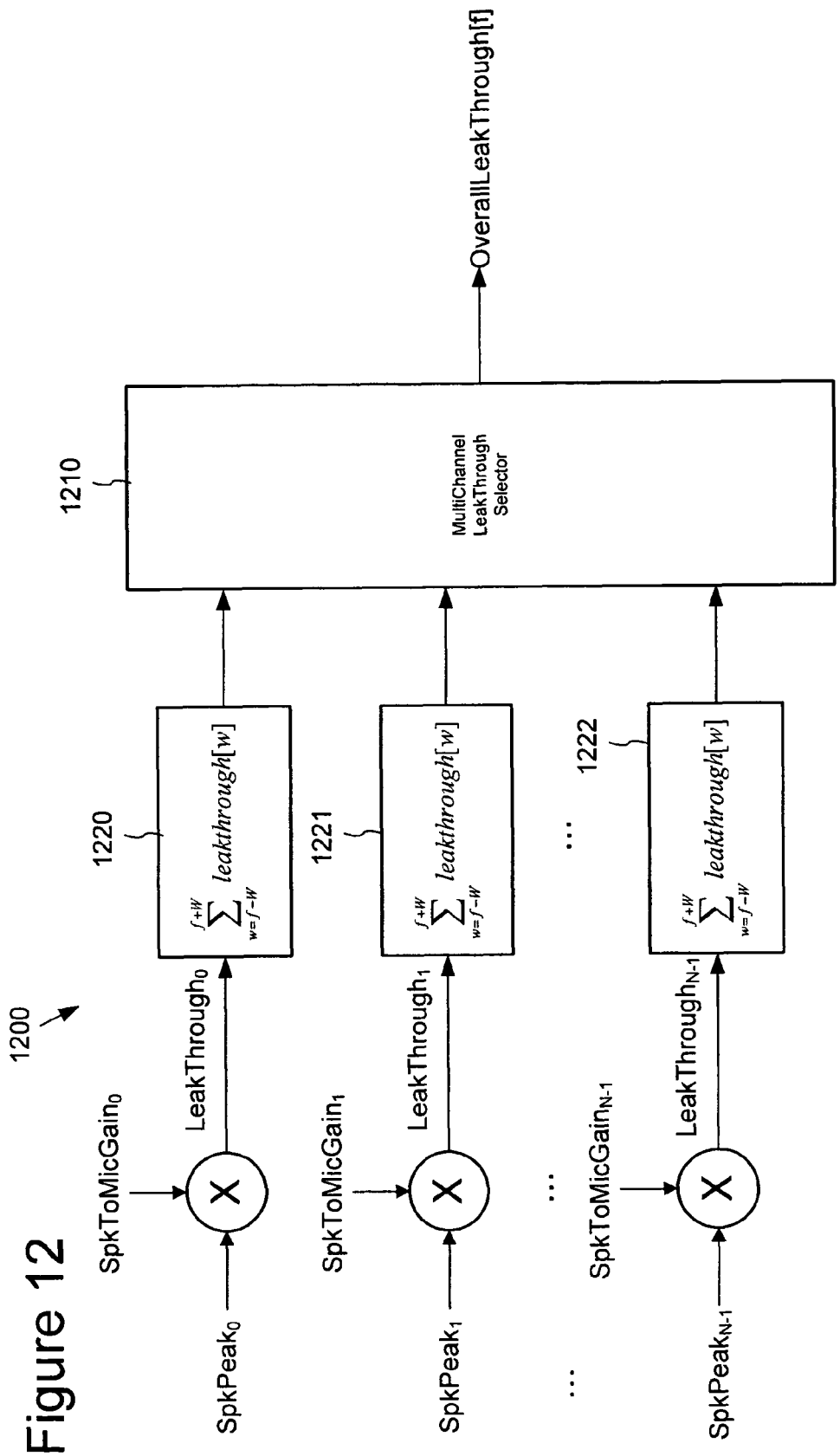
FIG. 12 is a flow diagram of a computation of an overall leak through estimate for multiple microphone channels.

Therefore, what is needed is a method to estimate a single leak through estimate for all channels. As illustrated in FIG. 12, the multiple microphone channel leak through estimate process calculates a leak through estimate for each channel of the microphone array, then applies a multi-channel leak through selector 1210 to produce an overall leak through estimate for the microphone array as a function of the individual channel leak through estimates. The overall leak through estimate can be achieved in several ways.

For a beam forming type microphone array process, the multi-channel leak through selector 1210 computes the dot product of the separate filtered, leak through estimates for each channel with the corresponding microphone array coefficients. This resulting dot product represents the filtered, leak through estimate in the direction pointed to by the array.

Alternative methods that the multi-channel leak through selector 1210 may implement for computing a single filtered, leak through estimate are to use the maximum of the individual channel filtered, leak through estimates; the minimum filtered, leak through estimate; or some other weighting of the filtered, leak through estimates, such as equal weighting or weighting varying according to a set of weighting coefficients.

In the overall leak through process as shown in FIG. 12, the individual leak through estimates are averaged (filtered) across frequency bands in filters 1220-1222 before the estimates are combined. Alternatively, the individual leak through estimates can be combined first and then filtered across frequency bands (i.e., the multi-channel leak through selector 1210 comes before applying a post-filter instead of pre-filters 1220-1222). Such post-filtering can be problematic for some types of combining, such as taking the maximum or the minimum.

Figure 13:
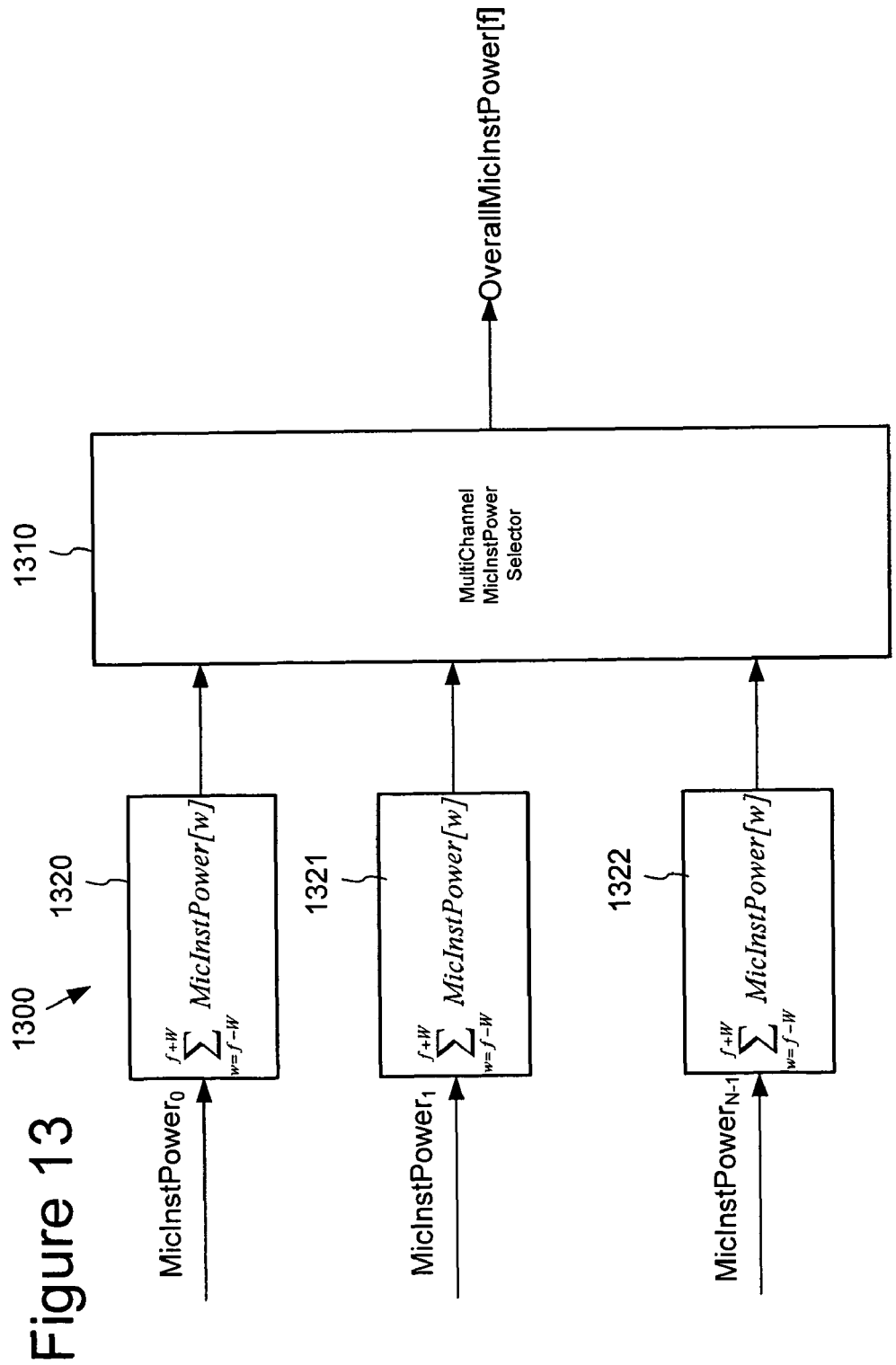
FIG. 13 is a flow diagram of a computation of an overall instantaneous microphone power estimate for multiple microphone channels.

A separate method to compute a single instantaneous microphone power estimate for all channels is also needed for microphone array integration. FIG. 13 illustrates a process 1300 to produce this single, overall instantaneous estimate for the microphone array. In the illustrated process 1300, the instantaneous microphone power estimates are combined via a multi-channel instantaneous microphone power selector 1310 to produce an overall instantaneous microphone power estimate for the microphone array. The process also includes filtering 1320-1322 of the individual channel instantaneous microphone power estimates. The selector 1310 can produce the overall estimate in various alternative ways.

Again, a preferred selector method for the beam-forming type microphone array process is to compute the dot product of the separate filtered, instantaneous microphone power estimates for each channel with the corresponding microphone array coefficients. This resulting dot product represents the filtered, instantaneous microphone power estimate in the direction pointed to by the array (i.e., the DOA estimate of the SSL process).

Alternative methods that the multi-channel selector 1310 may implement for computing a single filtered, instantaneous microphone power estimate include using the maximum, filtered instantaneous microphone power estimate; the minimum, filtered instantaneous microphone power estimate; or some other weighting of the filtered, instantaneous microphone power estimate such as equal weighting or weighting varying according to a set of weighting coefficients.

As shown in FIG. 13, the illustrated overall microphone power process 1300 applies filters 1320-1322 averaging individual instantaneous microphone power estimates across frequency bands before the estimates are combined via the selector 1310. Alternatively, the individual instantaneous microphone power estimates can be combined first and then filtered across frequency bands by a post-filter. Post-averaging can be problematic for some types of combining such as taking the maximum or the minimum.

Figure 14:
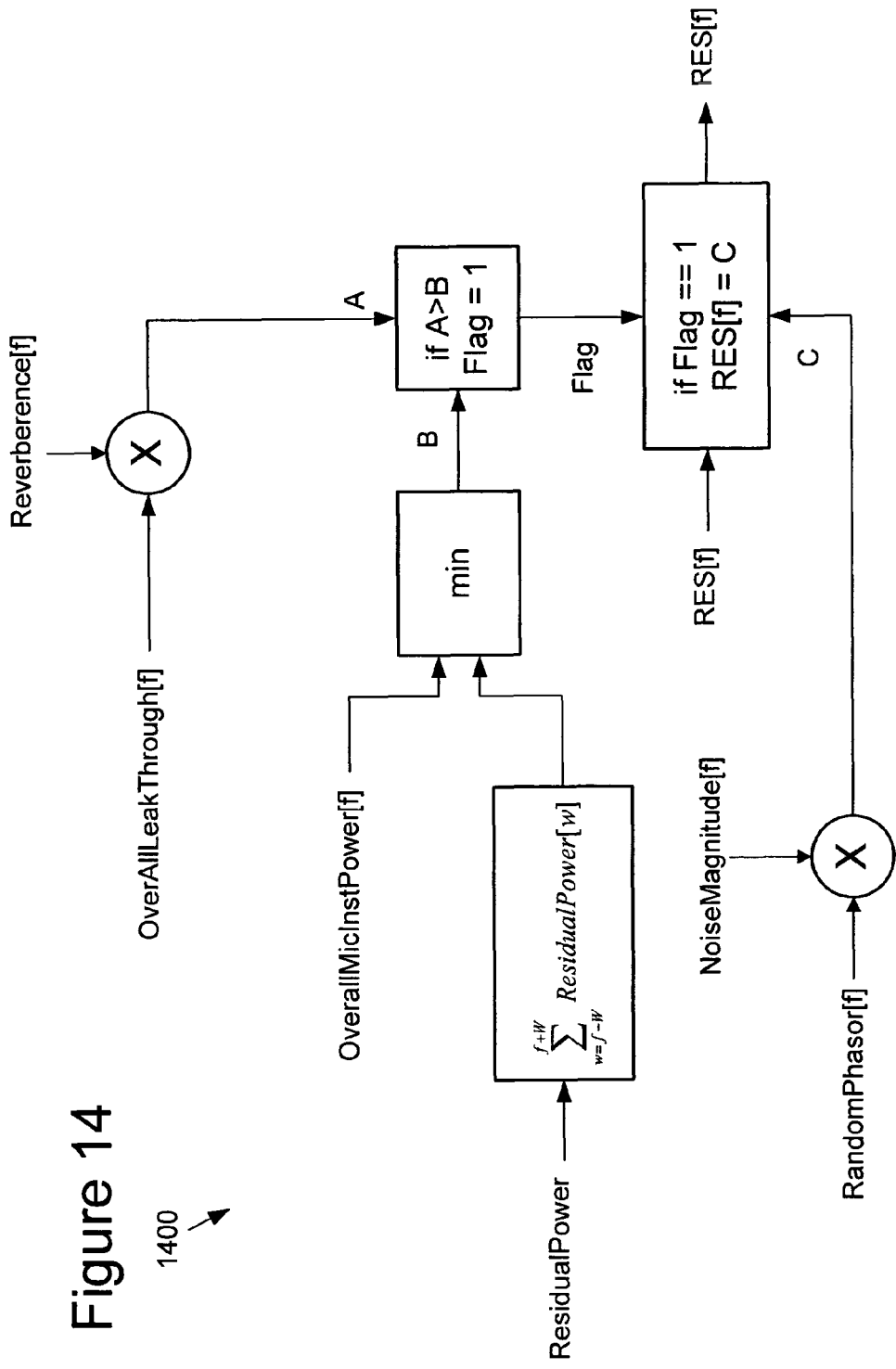
FIG. 14 is a flow diagram of a center clipping process with extensions for microphone arrays that can be included in the two-way voice communication systems of FIG. 9-11.

FIG. 14 shows the CC process 1400 for microphone array integration utilizing the overall leak through estimate produced by the process 1200 in FIG. 12, and the overall instantaneous microphone power estimate computed via the process 1300 in FIG. 13.

Figure 15:
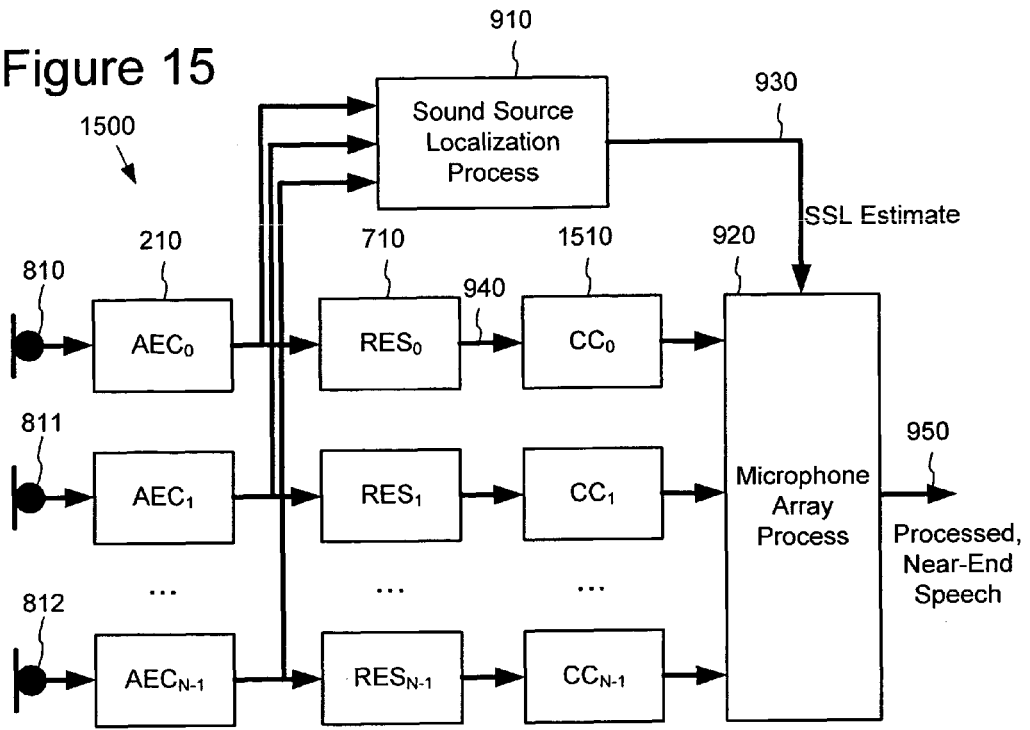
FIG. 15 is a block diagram of a first example of one end of a two-way voice communication system having multiple microphone channels, with integrated center clipping and sound-source localization/microphone array processes.
Figure 16:
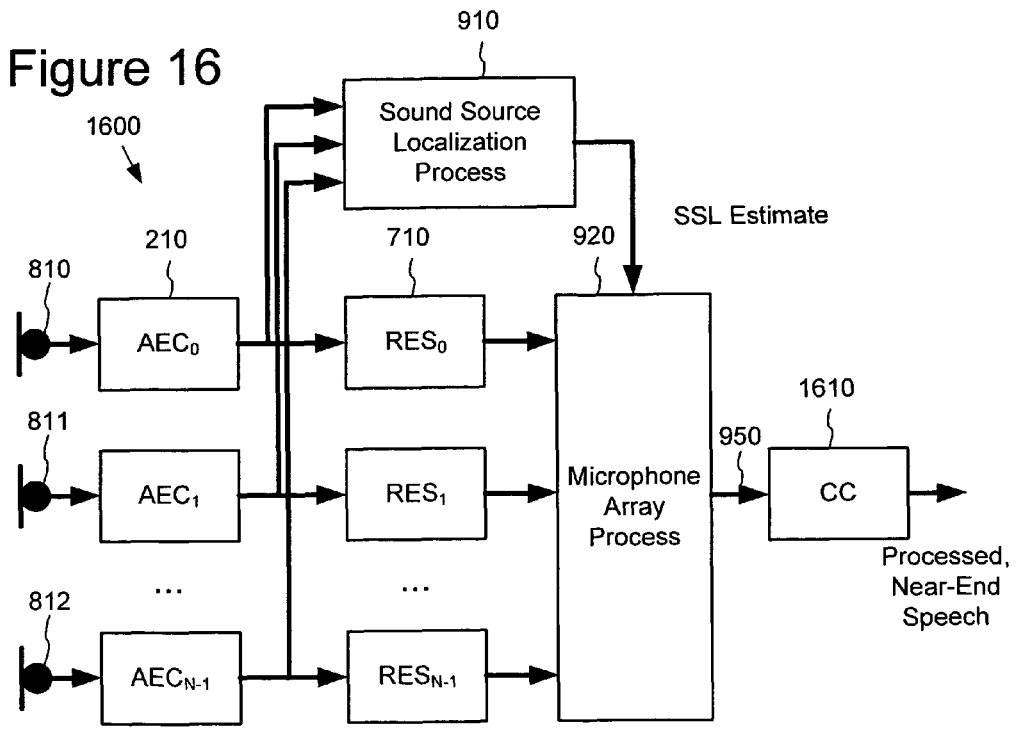
FIG. 16 is a block diagram of a second example of one end of a two-way voice communication system having multiple microphone channels, with integrated center clipping and sound-source localization/microphone array processes.

The CC process 1400 with microphone array integration can be incorporated into the above described integrated RES and SSL/MA architectures (FIG. 8 and FIGS. 9-11) either as a process applied to each microphone channel prior to the SSL/MA, or applied after the SSL/MA process. For example, FIG. 15 shows a two-way communication system 1500 using a modified version of the first alternative architecture (shown in FIG. 9) in which a CC block 1510 implementing the CC process 1400 (FIG. 14) is applied at the output 940 of the RES process 710 on each microphone channel. As another example, FIG. 16 shows a two-way communications system 1600 using another modification of the first alternative architecture in which a CC block 1610 implementing the CC process 1400 (FIG. 14) is applied at the output 950 of the microphone array process 920.

3. Computing Environment

The above-described processing techniques for RES and CC with microphone array integration can be realized on any of a variety of two-way communication systems, including among other examples, computers; speaker telephones; two-way radio; game consoles; conferencing equipment; and etc. The AEC digital signal processing techniques can be implemented in hardware circuitry, in firmware controlling audio digital signal processing hardware, as well as in communication software executing within a computer or other computing environment, such as shown in FIG. 17.

Figure 17:
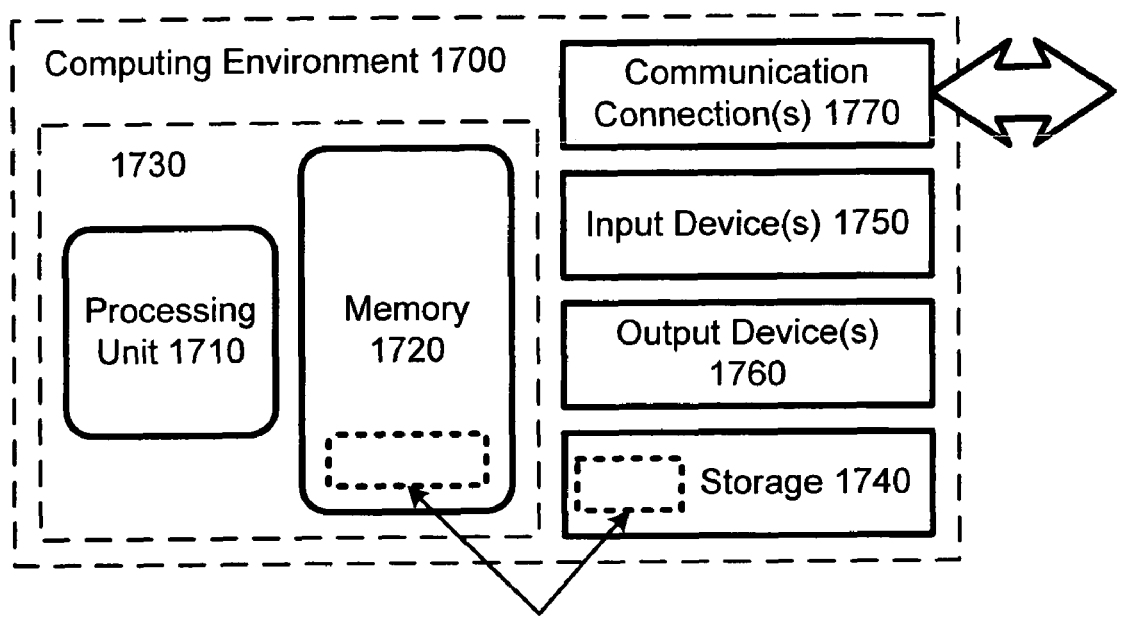
FIG. 17 is a block diagram of a suitable computing environment for implementing a two-way communication system utilizing the AEC implementation having improved robustness and quality.

FIG. 17 illustrates a generalized example of a suitable computing environment (1700) in which described embodiments may be implemented. The computing environment (1700) is not intended to suggest any limitation as to scope of use or functionality of the invention, as the present invention may be implemented in diverse general-purpose or special-purpose computing environments.

With reference to FIG. 17, the computing environment (1700) includes at least one processing unit (1710) and memory (1720). In FIG. 17, this most basic configuration (1730) is included within a dashed line. The processing unit (1710) executes computer-executable instructions and may be a real or a virtual processor. In a multi-processing system, multiple processing units execute computer-executable instructions to increase processing power. The memory (1720) may be volatile memory (e.g., registers, cache, RAM), non-volatile memory (e.g., ROM, EEPROM, flash memory, etc.), or some combination of the two. The memory (1720) stores software (1780) implementing the described audio digital signal processing for RES and CC with microphone array integration.

A computing environment may have additional features. For example, the computing environment (1700) includes storage (1740), one or more input devices (1750), one or more output devices (1760), and one or more communication connections (1770). An interconnection mechanism (not shown) such as a bus, controller, or network interconnects the components of the computing environment (1700). Typically, operating system software (not shown) provides an operating environment for other software executing in the computing environment (1700), and coordinates activities of the components of the computing environment (1700).

The storage (1740) may be removable or non-removable, and includes magnetic disks, magnetic tapes or cassettes, CD-ROMs, CD-RWs, DVDs, or any other medium which can be used to store information and which can be accessed within the computing environment (1700). The storage (1740) stores instructions for the software (1780) implementing the described audio digital signal processing for RES and CC with microphone array integration.

The input device(s) (1750) may be a touch input device such as a keyboard, mouse, pen, or trackball, a voice input device, a scanning device, or another device that provides input to the computing environment (1700). For audio, the input device(s) (1750) may be a sound card or similar device that accepts audio input in analog or digital form from a microphone or microphone array, or a CD-ROM reader that provides audio samples to the computing environment. The output device(s) (1760) may be a display, printer, speaker, CD-writer, or another device that provides output from the computing environment (1700).

The communication connection(s) (1770) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described audio digital signal processing for RES and CC with microphone array integration techniques herein can be described in the general context of computer-readable media. Computer-readable media are any available media that can be accessed within a computing environment. By way of example, and not limitation, with the computing environment (1700), computer-readable media include memory (1720), storage (1740), communication media, and combinations of any of the above.

The described audio digital signal processing for RES and CC with microphone array integration techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of out invention may be applied, we claim as our invention all such embodiments as may come within the scope and spirit of the following claims and equivalents thereto.

We claim:

1. A method of digital signal processing at a near end of a two-way communication system for reducing echo for a remote end, the near end having a speaker for playing audio from the remote end and an array of microphones to capture near end speech, the method comprising:
  separately applying an acoustic echo cancellation process for canceling remote-end echo on each of a plurality of microphone channels from the microphone array;
  performing sound source localization and microphone array processing on the microphone channels to produce a source-localized speech channel for transmission to the remote end;
  performing center clipping on the source-localized speech channel, and wherein the center clipping comprises:
    for each of a plurality of frequency bands,
      computing an overall leak through estimate for the microphone channels, wherein said computing the overall leak through estimate comprises:
        computing separate leak through estimates at the frequency band for each of the microphone channels;
        filtering the separate leak through estimates across neighboring frequency bands; and
        combining the separate leak through estimates to produce the overall leak through estimate at the frequency band;
      computing an overall instantaneous microphone power estimate for the microphone channels;
      determining whether the overall leak through estimate exceeds a minimum of the overall instantaneous microphone power estimate and residual power at the frequency band on the source-localized speech channel;
      if so, then setting a residual value magnitude for the frequency band on the source-localized speech channel equal to the frequency band's magnitude for a background noise floor and a complex phase of a residual value for the frequency band on the source-localized speech channel equal to a random complex phasor; and
      if not, then passing the residual value for the frequency band on the source-localized speech channel unchanged, wherein said combining the leak through estimates comprises selecting a maximum of the leak through estimates of the microphone channels at the frequency band.

2. A method of digital signal processing at a near end of a two-way communication system for reducing echo for a remote end, the near end having a speaker for playing audio from the remote end and an array of microphones to capture near end speech, the method comprising:
  separately applying an acoustic echo cancellation process for canceling remote-end echo on each of a plurality of microphone channels from the microphone array;
  performing sound source localization and microphone array processing on the microphone channels to produce a source-localized speech channel for transmission to the remote end;
  performing center clipping on the source-localized speech channel, and wherein the center clipping comprises:
    for each of a plurality of frequency bands,
      computing an overall leak through estimate for the microphone channels, wherein said computing the overall leak through estimate comprises:
        computing separate leak through estimates at the frequency band for each of the microphone channels;
        filtering the separate leak through estimates across neighboring frequency bands; and
        combining the separate leak through estimates to produce the overall leak through estimate at the frequency band;
      computing an overall instantaneous microphone power estimate for the microphone channels;
      determining whether the overall leak through estimate exceeds a minimum of the overall instantaneous microphone power estimate and residual power at the frequency band on the source-localized speech channel;
      if so, then setting a residual value magnitude for the frequency band on the source-localized speech channel equal to the frequency band's magnitude for a background noise floor and a complex phase of a residual value for the frequency band on the source-localized speech channel equal to a random complex phasor; and
      if not, then passing the residual value for the frequency band on the source-localized speech channel unchanged, wherein said combining the leak through estimates comprises selecting a minimum of the leak through estimates of the microphone channels at the frequency band.

3. A method of digital signal processing at a near end of a two-way communication system for reducing echo for a remote end, the near end having a speaker for playing audio from the remote end and an array of microphones to capture near end speech, the method comprising:

separately applying an acoustic echo cancellation process for canceling remote-end echo on each of a plurality of microphone channels from the microphone array;

performing sound source localization and microphone array processing on the microphone channels to produce a source-localized speech channel for transmission to the remote end;

performing center clipping on the source-localized speech channel, and wherein the center clipping comprises:

for each of a plurality of frequency bands, computing an overall leak through estimate for the microphone channels, computing an overall instantaneous microphone power estimate for the microphone channels, wherein said computing the overall instantaneous microphone power estimate comprises:

computing separate instantaneous microphone power estimates at the frequency band for each of the microphone channels;

filtering the separate instantaneous microphone power estimates across neighboring frequency bands; and combining the separate instantaneous microphone power estimates to produce the overall instantaneous microphone power estimate at the frequency band;

determining whether the overall leak through estimate exceeds a minimum of the overall instantaneous microphone power estimate and residual power at the frequency band on the source-localized speech channel;

if so, then setting a residual value magnitude for the frequency band on the source-localized speech channel equal to the frequency band's magnitude for a background noise floor and a complex phase of a residual value for the frequency band on the source-localized speech channel equal to a random complex phasor; and if not, then passing the residual value for the frequency band on the source-localized speech channel unchanged, wherein said combining the instantaneous microphone power estimates comprises selecting a maximum of the instantaneous microphone power estimates of the microphone channels at the frequency band.

4. A method of digital signal processing at a near end of a two-way communication system for reducing echo for a remote end, the near end having a speaker for playing audio from the remote end and an array of microphones to capture near end speech, the method comprising:

separately applying an acoustic echo cancellation process for canceling remote-end echo on each of a plurality of microphone channels from the microphone array;

performing sound source localization and microphone array processing on the microphone channels to produce a source-localized speech channel for transmission to the remote end;

performing center clipping on the source-localized speech channel, and wherein the center clipping comprises:

for each of a plurality of frequency bands, computing an overall leak through estimate for the microphone channels;

computing an overall instantaneous microphone power estimate for the microphone channels, wherein said computing the overall instantaneous microphone power estimate comprises:

computing separate instantaneous microphone power estimates at the frequency band for each of the microphone channels;

filtering the separate instantaneous microphone power estimates across neighboring frequency bands; and combining the separate instantaneous microphone power estimates to produce the overall instantaneous microphone power estimate at the frequency band;

determining whether the overall leak through estimate exceeds a minimum of the overall instantaneous microphone power estimate and residual power at the frequency band on the source-localized speech channel;

if so, then setting a residual value magnitude for the frequency band on the source-localized speech channel equal to the frequency band's magnitude for a background noise floor and a complex phase of a residual value for the frequency band on the source-localized speech channel equal to a random complex phasor; and if not, then passing the residual value for the frequency band on the source-localized speech channel unchanged, wherein said combining the instantaneous microphone power estimates comprises selecting a minimum of the instantaneous microphone power estimates of the microphone channels at the frequency band.

5. A communication end device of a two-way communication system, the device comprising:

a plurality of microphones for capturing local speech as a plurality of microphone channels;

a speaker for playing remote audio received from the other end device;

a plurality of audio echo canceling components arranged separately on the microphone channels for canceling echo of the remote audio captured on the respective microphone channel;

a sound source localization and microphone array processing component operating on the microphone channels to produce a source-localized speech channel for transmission to the remote end, wherein said sound source localization and microphone array processing component produces a set of microphone array coefficients for weighting the microphone channels according to an estimated direction of arrival of the near end speech;

a center clipping processing component for performing center clipping on a particular channel, wherein for each of a plurality of frequency bands, the center clipping comprises:

computing an overall leak through estimate for the microphone channels, by:

computing separate leak through estimates at the frequency band for each of the microphone channels;

filtering the separate leak through estimates across neighboring frequency bands; and computing a dot product of the leak through estimates and the microphone array coefficients of the respective microphone channels to produce the overall leak through estimate at the frequency band;

computing an overall instantaneous microphone power estimate for the microphone channels;

determining whether the overall leak through estimate exceeds a minimum of the overall instantaneous microphone power estimate and residual power at the frequency band on the particular channel;

if so, then setting a residual value magnitude for the frequency band on the particular channel equal to the frequency band's magnitude for a background noise floor and a complex phase of a residual value for the frequency band on the particular channel equal to a random complex phasor; and if not, then passing the residual value for the frequency band on the particular channel unchanged, wherein the center clipping is performed on each of the microphone channels following the acoustic echo canceling components.

6. A communication end device of a two-way communication system, the device comprising:

a plurality of microphones for capturing local speech as a plurality of microphone channels;

a speaker for playing remote audio received from the other end device;

a plurality of audio echo canceling components arranged separately on the microphone channels for canceling echo of the remote audio captured on the respective microphone channel;

a sound source localization and microphone array rocessing component operating on the microphone channels to produce a source-localized speech channel for transmission to the remote end, wherein said sound source localization and microphone array processing component produces a set of microphone array coefficients for weighting the microphone channels according to an estimated direction of arrival of the near end speech;

a center clipping processing component for performing center clipping on a particular channel, wherein for each of a plurality of frequency bands, the center clipping comprises:

computing an overall leak through estimate for the microphone channels;

computing an overall instantaneous microphone power estimate for the microphone channels, by:

computing separate instantaneous microphone power estimates at the frequency band for each of the microphone channels;

filtering the separate instantaneous microphone power estimates across neighboring frequency bands; and computing a dot product of the instantaneous microphone power estimates and the microphone array coefficients of the respective microphone channels to produce the overall leak through estimate at the frequency band;

determining whether the overall leak through estimate exceeds a minimum of the overall instantaneous microphone power estimate and residual power at the frequency band on the particular channel;

if so, then setting a residual value magnitude for the frequency band on the particular channel equal to the frequency band's magnitude for a background noise floor and a complex phase of a residual value for the frequency band on the particular channel equal to a random complex phasor; and if not, then passing the residual value for the frequency band on the particular channel unchanged, wherein the center clipping is performed on each of the microphone channels following the acoustic echo canceling components.

* * * * *

UNITED STATES PATENT AND TRADEMARK OFFICE
CERTIFICATE OF CORRECTION

| | | |
|---|---|---|
| PATENT NO. | : 7,831,035 B2 | Page 1 of 1 |
| APPLICATION NO. | : 11/413710 | |
| DATED | : November 9, 2010 | |
| INVENTOR(S) | : Stokes et al. | |

It is certified that error appears in the above-identified patent and that said Letters Patent is hereby corrected as shown below:

In column 15, line 22-23, in Claim 6, delete "rocessing" and insert -- processing --, therefor.

Signed and Sealed this
Third Day of May, 2011

David J. Kappos
*Director of the United States Patent and Trademark Office*